United States Patent [19]

Rockstead

[11] Patent Number: 4,568,970
[45] Date of Patent: Feb. 4, 1986

[54] STEREOSCOPIC TELEVISION SYSTEM AND APPARATUS

[76] Inventor: Walter R. Rockstead, Rte. 1, Box 2, Sheldon, Wis. 54766

[21] Appl. No.: 645,685

[22] Filed: Aug. 30, 1984

[51] Int. Cl.$^4$ .............................................. H04N 13/00
[52] U.S. Cl. ...................................... 358/91; 350/143; 358/88
[58] Field of Search .......................... 358/88, 91, 92, 3; 350/138, 139, 143

[56] References Cited

U.S. PATENT DOCUMENTS

| | | | |
|---|---|---|---|
| 2,279,443 | 4/1942 | Chanosky | 354/112 |
| 3,670,097 | 6/1972 | Jones | 358/91 |
| 3,674,921 | 7/1972 | Goldsmith | 358/3 |
| 3,697,675 | 10/1972 | Beard | 358/91 |
| 3,784,738 | 1/1974 | Natter | 358/92 |
| 3,818,125 | 6/1974 | Butterfield | 358/91 |
| 4,122,484 | 10/1978 | Tan | 358/3 |
| 4,295,153 | 10/1981 | Gibson | 358/88 |

*Primary Examiner*—Howard W. Britton
*Attorney, Agent, or Firm*—Norman B. Rainer

[57] ABSTRACT

A system for producing motion pictures comprises a television camera, television receiver, and a special optical device. The optical device is capable of adjustment to a picture-taking mode wherein the device, when placed before the lens of the camera, produces side-by-side left and right rectangular images of the subject. When adjusted to a viewing mode and utilized to view said side-by-side images on the television receiver, said images are separately delivered to the viewing person's left and right eyes, thereby producing a stereoscopic effect.

7 Claims, 7 Drawing Figures

STEREOSCOPIC TELEVISION SYSTEM AND APPARATUS

BACKGROUND OF THE INVENTION

This invention concerns a system for producing stereoscopic viewing effects, and more particularly concerns a system and its apparatus for storing moving images and viewing said images in a manner producing a three-dimensional or stereoscopic effect.

It has long been known that flat pictures, whether stationary or moving, can be made to have a three-dimensional effect using special techniques and equipment. For example, in stereoscopic optical methods, two different pictures are made of the same scene or object at a horizontally separated spacing equivalent to human eye spacing, and the resultant pictures are separately viewed by each appropriate eye. In stereoscopic viewers for still photographs, the two different photographs are mounted in side-by-side relationship and viewed through a lens or aperture system that causes each of the viewer's eyes to see separate pictures. Since the eyes thereby see the object in the same manner as originally "seen" by the camera which produced the pictures, a stereoscopic three-dimensional effect is produced.

In the case of moving pictures, the two views taken of a given scene by two lenses laterally separated by human eye separation distance are projected onto the same viewing screen in superimposed juxtaposition. Each view is, however, modified so as to facilitate separate perception by the eyes of the viewer. The views may, for example, be projected through polarizing filters mounted in orientations 90° apart. When the person who watches the moving picture wears special glasses having two different polarizing filters, each eye sees the appropriate one of the two views, thereby providing a depth perception or stereoscopic visual effect.

The wearing of glasses or other specialized equipment has been found by many to be unpleasant, and occasionally producing headaches. Although a stereoscopic effect can be produced by motion picture film having been exposed through camera lenses equipped with polarizing filters, and subsequently projected upon a flat screen and viewed through polarizing filters, such approach is of minimal effectiveness with videotape systems because of the optical effects produced by the phosphor coatings of the videotubes. Equipment utilized for making and viewing stereoscopic moving pictures is generally complex and expensive, thereby restricting its use to professional, commercially rewarding endeavors.

It is accordingly an object of the present invention to provide a system for stereoscopic television viewing.

It is another object of this invention to provide a system of the foregoing object which does not require that the viewing person wear a specialized device.

It is a further object of this invention to provide a system of the aforesaid nature of minimal equipment requirements for stereoscopically recording and viewing images on videotape.

It is still another object of the present invention to provide apparatus of simple and rugged construction and low cost for making and viewing motion pictures in a manner which produces a stereoscopic effect.

These objects and other objects and advantages of the invention will be apparent from the following description.

SUMMARY OF THE INVENTION

The above and other beneficial objects and advantages are accomplished in accordance with the present invention by a system wherein: (a) two separate images of a subject are recorded on magnetic videotape from left and right camera viewpoints horizontally spaced apart about 2½ inches, corresponding to the average separation distance between human eyes, (b) the recorded images are reproduced as light images having rectangular borders on a television receiver in separate side-by-side relationship retaining the left and right positions recorded by the camera, and (c) the reproduced light images are viewed through an adjustable viewing device which separately directs the left image to the viewing person's left eye and the right image to the viewing person's right eye.

The present invention further provides an optical device which serves the twofold purpose of enabling the camera to produce separate left and right images of a subject, and functioning as an adjustable viewing device in the aforesaid manner.

The optical device is comprised of:

(a) a box-like housing of substantially rectangular configuration and comprised of front and rear panels, side panels and upper and lower panels which are horizontally oriented during use of the device, said housing having a plane of symmetry that vertically bisects said upper and lower panels equidistantly between said side panels, (b) lower mounting means associated with said lower panel, (c) upper mounting means associated with said upper panel, (d) paired subject-directed rectangular apertures centered in said front panel, (e) a substantially centered aperture in said rear panel, and holding means disposed about said aperture on the exteriorly directed face of said rear panel adapted to removably and separately accommodate apertured adapters for viewing and picture-taking modes of operation, (f) left and right fixed flat reflective surfaces of rectangular periphery mounted within said housing in perpendicular disposition to said upper and lower panels and juxtaposed as the outer surfaces of a V-shaped configuration, the interior facing surfaces of the V being directed toward said front panel, said V having a straight apex line lying within said plane of symmetry adjacent said rear panel, said reflective surfaces being equi-angularly disposed with respect to said plane of symmetry and adapted to reflect light through the aperture of said rear panel, (g) left and right adjustable flat reflective surfaces of rectangular periphery mounted within said housing to pivot posts perpendicularly disposed to said upper and lower panels at locations between said fixed reflective surfaces and side panels, said adjustable reflective surfaces being symmetrically disposed about said plane of symmetry at adjustable angles thereto while reflectively facing the corresponding fixed reflective surfaces and adapted to receive light from said subject apertures for reflective transmission to said fixed reflective surfaces, and (g) control means exterior to said housing for simultaneously and equally changing the angles of said adjustable reflective surfaces with respect to said plane of symmetry, whereby (i) when placed in front of the lens of a camera and suitably adjusted by said control means to a picture-taking mode, the device will present to the lens side-by-side left and right images of a subject, and (j) when placed in front of the eyes of a viewing person to view reproduced flat side-by-side left and right images of said subject and suitably adjusted by said control means to a viewing mode, the device will separately present to the viewing person's left and right eyes corresponding left and right images of said subject, thereby causing said subject to be stereoscopically perceived.

In preferred embodiments of the device, mirrors are utilized as the reflective surfaces. In other embodiments, right triangular prisms may be employed wherein the hypotenuse surface is the reflective surface.

The V-shaped angle between the fixed reflective surfaces will range between about 90° and 100°, and the adjustable left and right reflective surfaces are disposed in a generally parallel relationship to the corresponding left and right fixed reflective surfaces. The apertured adapter for the viewing mode contains two rectangular apertures in side-by-side relationship equally spaced about said plane of symmetry. The apertured adapter for the picture-taking mode contains a single circular lens-accommodating aperture bisected by said plane of symmetry.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

Figure 5:
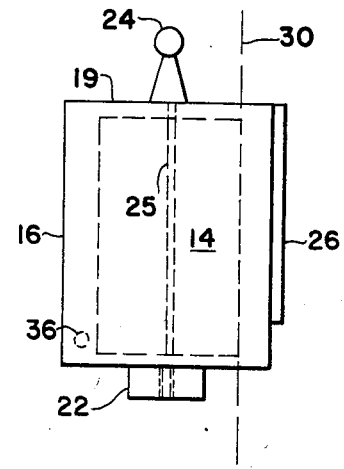
FIG. 5 is a side view taken from the right side of the illustration of FIG. 3.

For convenience in description, the terms "front" and "rear", or words of similar import will have reference to the left and right extremities, respectively, of the device appearing in FIG. 5. Similarly, the expressions "upper" and "lower" and equivalents thereof will have reference to the upper and lower extremities, respectively, of the device shown in FIG. 5.

DESCRIPTION OF THE PREFERRED EMBODIMENT

Referring to the drawing, an embodiment of the optical device 10 of the present invention is shown comprised of box-like housing 11 which encloses left and right fixed mirrors 12 and 13, respectively, and left and right adjustable mirrors 14 and 15, respectively.

Housing 11 is comprised of front and rear panels 16 and 17, respectively, side panels 18, and upper and lower panels 19 and 20, respectively. A plane of symmetry 21 vertically bisects said upper and lower panels.

Lower mounting means, in the form of threaded tripod mount 22, is centrally affixed to lower panel 20. Upper mounting means in the form of ball joint fitting 24 is centrally affixed to upper panel 19.

Figure 4:
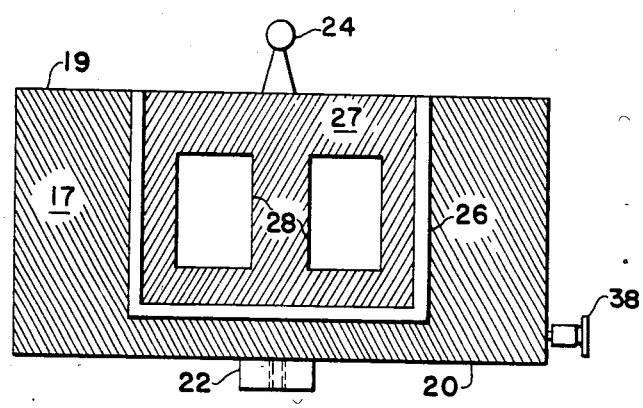
FIG. 4 is a rear view of the embodiment of FIG. 1.

Front panel 16 is provided with paired identical vertically elongated rectangular subject-directed apertures 25 equidistantly spaced from plane of symmetry 21, the spacing between the centers of said apertures being the average interpupillary distance of 3.6 inches. Rear panel 17 is provided with rectangular aperture 23 which is bordered on exteriorly directed surface 47 of said panel by holding means in the form of upwardly opening framing bracket 26 capable of slideably receiving apertured adapter panel 27. Two types of adapter panels are alternatively used in the device. In the taking mode illustrated in FIG. 1, the adapter panel has a single centered circular aperture 57 adapted to accommodate the camera lens. In the viewing mode shown in FIGS. 2, 4 and 7, adapter panel 27 has paired identical vertically elongated rectangular eye-directed apertures 28.

The left and right flat fixed mirrors are of rectangular periphery and held by mounting bracket 29 affixed to lower panel 20. Said fixed mirrors are perpendicularly disposed to said upper and lower panels and intersect in a V-configuration having apex line 30 lying within said plane of symmetry adjacent rear panel 17. Outer surfaces 31 of the V are reflective surfaces and are visible, at least in part, through eye-directed apertures 28. The interior, facing surfaces 32 of said V are directed toward front panel 16. The left and right fixed mirrors are equidistantly disposed with respect to said plane of symmetry. The angle of separation of the two mirrors, measured as angle A shown in FIG. 1 extending between opposed facing surfaces 32, will range between about 70° and 100°. the height of said fixed mirrors is such as to extend close to said upper and lower panels. The width of said fixed mirrors is such that the ratio of height to width of the mirrors will range between about 1.0 and 1.3

The left and right adjustable flat mirrors have inwardly directed reflective surfaces 33, and outwardly directed surfaces 34. A pivot post 35 is fixedly bonded with the aid of contour plate 58 to the outwardly directed surface 34 of each adjustable mirror along a centered vertical line therein. The pivot posts extend perpendicularly between journaled engagement with said upper and lower panels.

Control means comprising an elongated control rod 36 penetrates one side panel and extends across the housing closely adjacent said lower and front panels. Bushing blocks 37 attached to said lower panel permit rotative movement of the control rod, said movement facilitated by knurled flange 38. A portion of rod 36 is provided with threading 39 and moving block 40 that engages said threading and is adapted to move slideably along said lower panel. Said moving block is further adapted to pivotably engage a control pin 41 downwardly directed from the forward extremity of left adjustable mirror 14. By virtue of the arrangement of the control rod and components associated therewith, rotative movement of flange 38 will cause left mirror 14 to pivot in either desired direction about pivot post 35.

A coupling arm 42, positioned above the upper extremities of the mirrors, extends in pivoted engagement between the rear upper corner of left mirror 14 and the front upper corner of right mirror 15. The effect of said coupling arm is to cause the inclination of each adjustable mirror with respect to the rear panel, represented as angle B in FIG. 1, to be equal and opposite.

Figure 1:
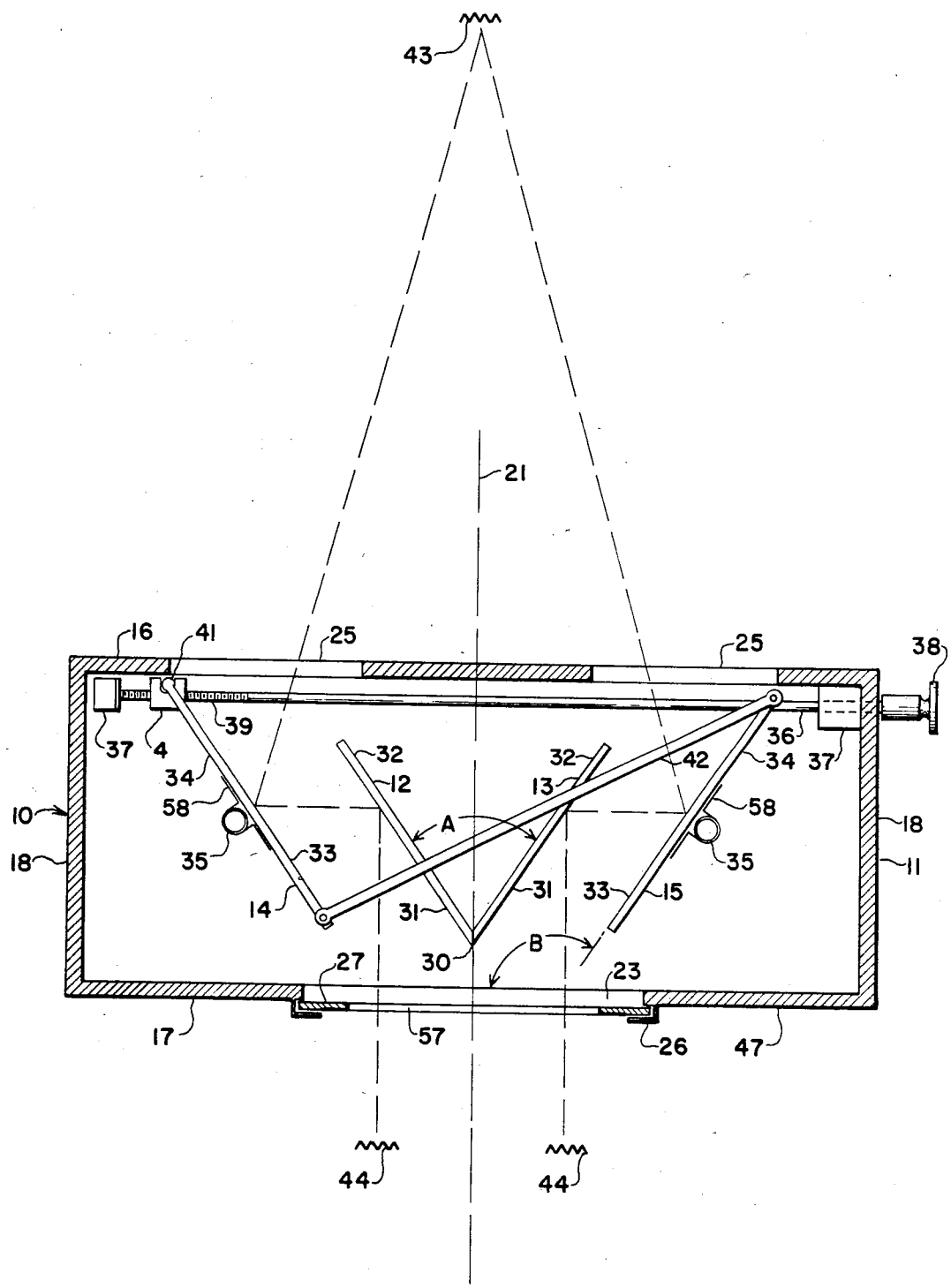
FIG. 1 is a top view of an embodiment of the optical device of the present invention shown in the picture-taking mode of the system of this invention, portions being broken away to reveal interior details.
Figure 2:
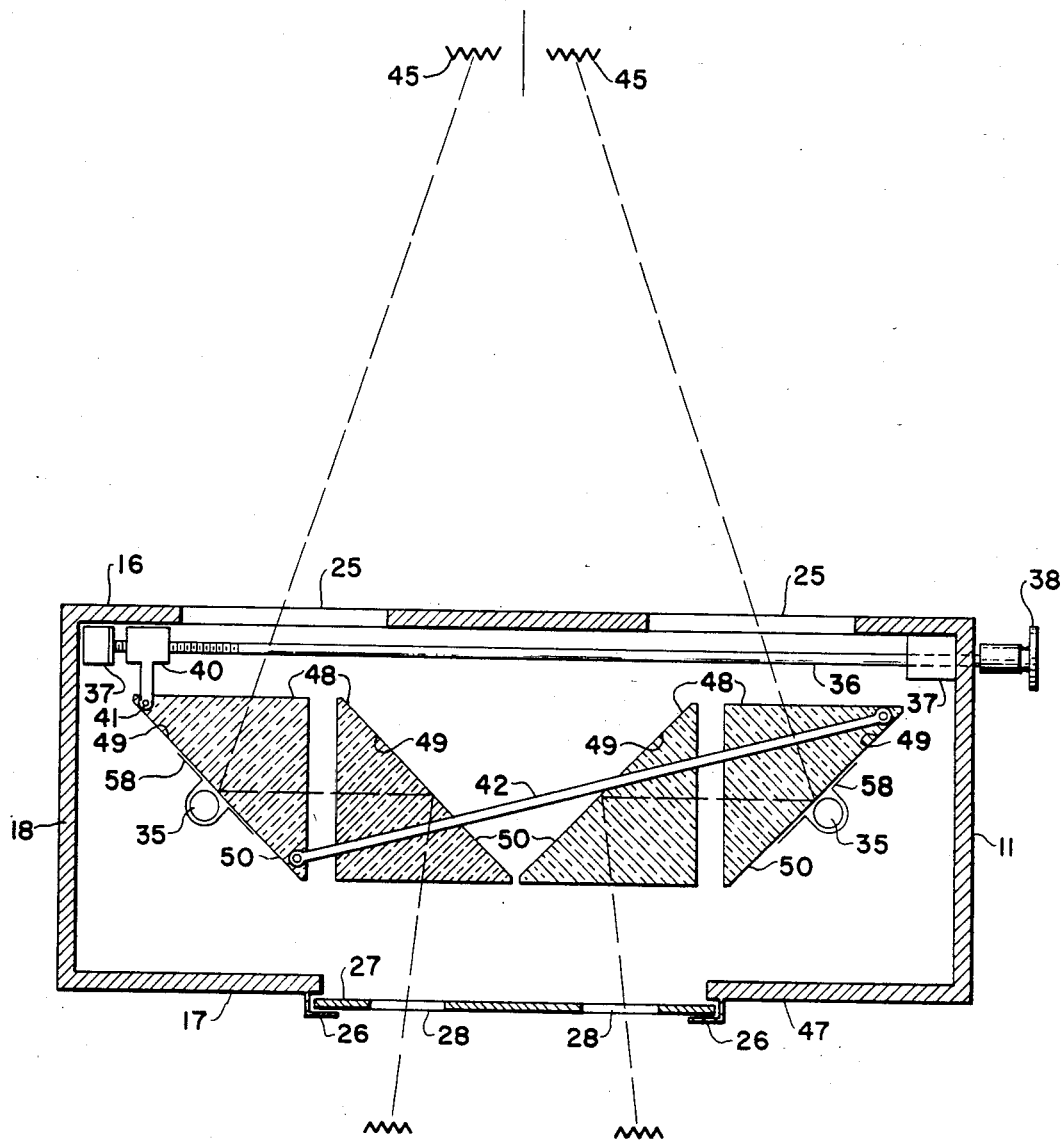
FIG. 2 is a top view of an alternative embodiment of the optical device of this invention, shown in the viewing mode.
Figure 3:
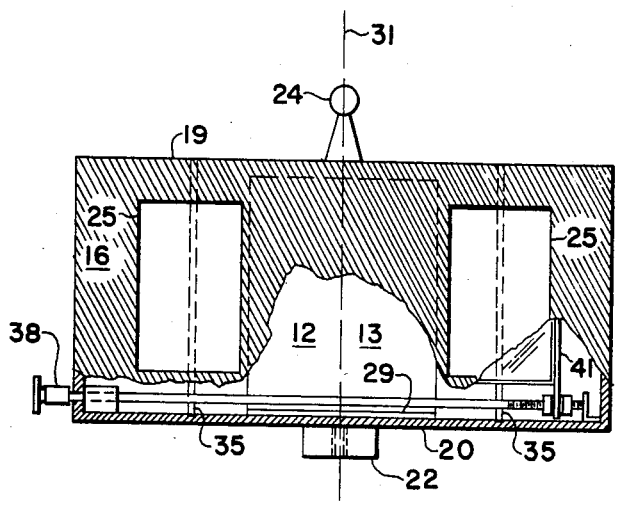
FIG. 3 is a front view of the embodiment of FIG. 1.

The effect of the controllable rotation of the adjustable mirrors is to enable the optical device in the picture-taking mode to cause a subject represented by wavy line 43 in FIG. 1 to be reproduced as two closely adjacent images 44 which can enter the lens of a camera, and to enable two contiguously side-by-side light images, having been reproduced from images 44 and represented as wavy lines 45 in FIG. 2, to be delivered in the viewing mode to separate left and right eyes of the viewer.

The alternative equivalent embodiment of the optical device of this invention shown in FIG. 2 utilizes right-angled triangular prisms 48 instead of mirrors. In each prism, the internal face 49 of the hypotenuse surface serves as the reflective surface, especially when the opposite exterior face 50 is provided with a reflective coating. The positions and configurations of the prisms and mechanical components are such as to secure the same results produced by the mirror-equipped embodiment of the device shown in FIGS. 1 and 3-5.

Figure 6:
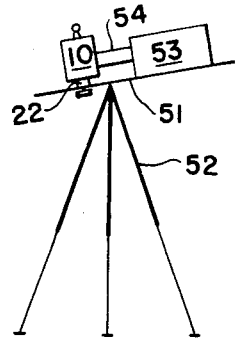
FIG. 6 illustrates the use of the optical device of this invention in the picture-taking mode in association with a conventional television camera.

For use in the picture taking mode, the optical device may be attached by way of tripod mount 22 to the support plate 51 of tripod 52, as shown in FIG. 6. A television camera 53 is positioned upon plate 51 in a manner such that lens 54 insertively engages a circular aperture of apertured adapter 27. When arranged in such manner, and control rod 36 suitably adjusted, left and right side-by-side images of the subject will be recorded by the camera.

Figure 7:
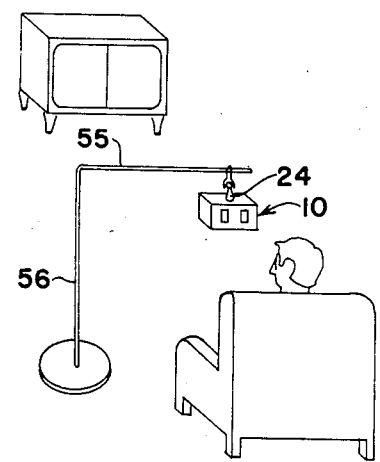
FIG. 7 illustrates the use of the optical device of this invention in the viewing mode positioned between a viewing person and a conventional television receiver.

When used in the viewing mode, as shown in FIG. 7, the device is preferably supported from ball joint fitting 24 by an overhead arm 55 which in turn may be supported by floor stand 56. In other embodiments, arm 55 or equivalents thereof may be supported by wall or ceiling anchored structural means. The optical device is preferably positioned between about 10 and 20 inches before the eyes of a seated viewer. By suitable manipulation of control rod 36, the left and right images on the television receiver screen will be directed to the viewer's left and right eyes, respectively, thereby creating a stereoscopic effect.

For economy of fabrication, several of the components of the optical device, and combinations thereof, may be made of plastic material by way of molding operations.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An optical device comprising:
    (a) a box-like housing of substantially rectangular configuration and comprised of front and rear panels, side panels and upper and lower panels which are horizontally oriented during use of the device, said housing having a plane of symmetry that vertically bisects said upper and lower panels equidistantly between said side panels,
    (b) lower mounting means associated with said lower panel,
    (c) upper mounting means associated with said upper panel,
    (d) paired subject-directed rectangular apertures centered in said front panel,
    (e) a substantially centered aperture in said rear panel, and holding means disposed about said aperture on the exteriorly directed face of said rear panel adapted to removably and separately accommodate apertured adapters for viewing and picture-taking modes of operation,
    (f) left and right fixed flat reflective surfaces of rectangular periphery mounted within said housing in perpendicular disposition to said upper and lower panels and juxtaposed as the outer surfaces of a V-shaped configuration, the interior facing surfaces of the V being directed toward said front panel, said V having a straight apex line lying within said plane of symmetry adjacent said rear panel, said reflective surfaces being equiangularly disposed with respect to said plane of symmetry and adapted to reflect light through the aperture of said rear panel,
    (g) left and right adjustable flat reflective surfaces of rectangular periphery mounted within said housing to pivot posts perpendicularly disposed to said upper and lower panels at locations between said fixed reflective surfaces and side panels, said adjustable reflective surfaces being symmetrically disposed about said plane of symmetry at adjustable angles thereto while reflectively facing the corresponding fixed reflective surfaces and adapted to receive light from said subject apertures for reflective transmission to said fixed reflective surfaces, and
    (h) control means exterior to said housing for simultaneously and equally changing the angles of said adjustable reflective surfaces with respect to said plane of symmetry, whereby
    (i) when placed in front of the lens of a camera and suitably adjusted by said control means to a picture-taking mode, the device will present to the lens side-by-side left and right images of a subject, and
    (j) when placed in front of the eyes of a viewing person for the viewing of reproduced flat side-by-side left and right images of said subject and suitably adjusted by said control means to a viewing mode, the device will separately present to the viewing person's left and right eyes corresponding left and right images of said subject, thereby causing said subject to be stereoscopically perceived.

2. The device of claim 1 wherein said reflective surfaces are mirrors.

3. The device of claim 1 wherein said reflective surfaces are the hypotenuse surfaces of right triangular prisms.

4. The device of claim 1 wherein the angle of the V between said fixed reflective surfaces ranges between 90° and 100°.

5. The device of claim 1 wherein the apertured adapter for the viewing mode contains two rectangular apertures in side-by-side relationship equally spaced about said plane of symmetry.

6. The device of claim 1 wherein the apertured adapter for the picture-taking mode contains a single circular lens-accommodating aperture bisected by said plane of symmetry.

7. A system for producing a stereoscopic moving picture comprising an optical device of claim 1, a television camera and a television receiver, whereby said optical device used in conjunction with said camera produces side-by-side left and right images of a subject, and said images, when shown on said receiver and viewed through said optical device, produce a three-dimensional effect.

* * * * *